United States Patent [19]

Kawamoto

[11] Patent Number: 5,350,829
[45] Date of Patent: Sep. 27, 1994

[54] METHOD FOR PRODUCING A POLYETHYLENE NAPHTHALATE

[75] Inventor: Fumio Kawamoto, Minami-ashigara, Japan

[73] Assignee: Fuji Photo Film Co., Ltd., Kanagawa, Japan

[21] Appl. No.: 90,780

[22] Filed: Jul. 13, 1993

[30] Foreign Application Priority Data

Jul. 22, 1992 [JP] Japan .................. 4-195313

[51] Int. Cl.$^5$ ............................. C08G 63/02
[52] U.S. Cl. .................... 528/272; 528/275; 528/283; 528/287; 528/288
[58] Field of Search ........... 528/272, 275, 283, 287, 528/288

[56] References Cited

U.S. PATENT DOCUMENTS 5,051,292  9/1991  Katoh et al. .................. 428/141

FOREIGN PATENT DOCUMENTS

266129/1989  10/1989  Japan .
266130/1989  10/1989  Japan .
287133/1989  11/1989  Japan .

*Primary Examiner*—John Kight, III
*Assistant Examiner*—Terressa Mosley
*Attorney, Agent, or Firm*—Sughrue, Mion, Zinn, Macpeak & Seas

[57] ABSTRACT

There is disclosed a method for producing a polyethylene naphthalate from a naphthalenedicarboxylic acid represented by the following formula (I) and a glycol, in the presence of one or more compounds of glycol-soluble magnesium compounds, glycol-soluble manganese compounds, and glycol-soluble zinc compounds; a nitrogen-containing basic compound; and a phosphorous compound; which method comprises adding a glycol-soluble germanium compound of a limited amount, as a polymerization catalyst, at a limited relationship between amounts of said metal compound, the said nitrogen-containing basic compound, and the said phosphorous compound.

formula (I)

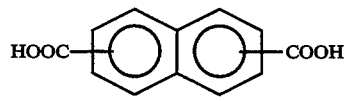

13 Claims, No Drawings

METHOD FOR PRODUCING A POLYETHYLENE NAPHTHALATE

FIELD OF THE INVENTION

The present invention relates to a method for producing a polyethylene naphthalate (hereinafter abbreviated as PEN), and more particularly to a method for producing PEN by direct polymerization, which resulting PEN is good in static adhesion to a cooling drum at the time of melt film formation, low in fine contaminants when formed into a film, high in softening point, and low coloration.

BACKGROUND OF THE INVENTION

In comparison with polyethylene terephthalates (hereinafter abbreviated as PET), PEN is excellent, for example, in mechanical strength and heat stability. PEN is used for films for magnetic tapes, for films for packaging, and for condensers; and it is also being studied in recent years for photograph supports because, for example, of it dimensional stability in the form of a thin film.

As methods for producing PEN, the transesterification process, which uses, as raw materials, a dimethyl naphthalate (e.g., 2,6-dimethyl naphthalate) and ethylene glycol; and the direct polymerization process, which uses, as raw materials, a naphthalenedicarboxylic acid (e.g., 2,6-naphthalenedicarboxylic acid) and ethylene glycol; are known; and each of them can be carried out batchwise or continuously.

Conventionally, in many cases, although PEN film is produced by the transesterification process, as the purity of a dimethyl carboxylate, such as 2,6-dimethyl carboxylate, is increased, study of the direct polymerization process, whose cost is low, worthy of vigorous pursuit.

Generally, PEN film is obtained by melt extrusion by an extruder followed by monoaxial or biaxial stretching. At the time of melt extrusion the adhesion of PEN in the form of a sheet to a cooling drum is a very important factor in determining the evenness of the film surface. As a means to improve this adhesion, it is known (e.g., JP-B ("JP-B" means examined Japanese patent publication) No. 6142/1962) that an electrode is provided for applying high voltage between the extruder mouthpiece and the cooling drum, to give an electric charge to the unsolidified PEN, so that the adhesion to the cooling drum may be increased (hereinafter referred to as static adhesion). Further, JP-B No. 40414/1973 and JP-A ("JP-A" means unexamined published Japanese patent application) Nos. 81325/1975 and 109715/1975 are also known.

However, if the speed of the film formation is increased to increase the productivity of the film, the deposition of the electric charge on the unsolidified sheet is decreased, deteriorating the adhesion to the cooling drum, thereby causing the surface of the sheet to have a rough texture with creases or pinholes. The surface of the film obtained by stretching such a sheet is poor in evenness, and the film cannot be used, in particular, for photographs.

That phenomenon appears more conspicuously in PEN obtained by the direct polymerization process that does not use a metal catalyst in the esterification reaction, in comparison with PEN obtained by the transesterification process that uses a large amount of a metal compound as a catalyst for the transesterification reaction. An attempt is also made to improve the static adhesion by adding an alkali metal compound or an alkali earth metal compound in the process of producing PEN, to increase the deposition of an electric charge (e.g., JP-A No. 70269/1976). The addition of a large amount of such metals into PEN is, however, liable to produce fine agglomerates (contaminants), or to concomitantly produce ether linkages that lower the softening point of the polymer, or to make the polymer colored. Therefore PEN obtained by this process is difficult to be used as a raw material that has the level of quality capable of being practically used as a support of photographs or the like.

As means of solving such problems, a technique wherein, in addition to a compound of a metal, such as magnesium and manganese, an alkali metal compound and/or an alkali earth metal compound as well as a phosphorus compound are added (e.g., JP-A Nos. 84322/1980 and 89329/1980) is disclosed. Further, a technique wherein, in addition to a compound of a metal, such as magnesium and manganese, a tertiary amine or a quaternary ammonium hydroxide compound, specifically, such as triethylamine, tributylamine, dimethylaniline, pyridine, quinoline, tetraethylammonium hydroxide, tetrabutylammonium hydroxide, or triethylbenzylhydroammonium oxide and a phosphorus compound, specifically, such as trimethyl phosphate, a mono- or di-ethyl ester of phosphoric acid, phosphoric acid, triethyl phosphite, diethyl phosphite, or phosphorous acid, are added (e.g., JP-A Nos. 115425/1980, 287133/1989, 266130/1989, and 266129/1989); is disclosed.

Even the films obtained through these techniques are not satisfactory for original printing plates, microfilms, internegative films for movies, and photograph films, such as reversal films, which are particularly highly required to be little colored and to contain little contaminants.

Further, in the case of films that are color negative films for amateurs for a high macrographic rate or high-speed films, coloring due to contaminants and the number of contaminants become, of course, issues.

SUMMARY OF THE INVENTION

Therefore, an object of the present invention is to provide a method for producing PEN suitable for supports of photographic films, such as high-speed color negative films, for original printing plates, for microfilms, for internegative films, and for reversal films, which PEN, in spite of the inclusion of a relatively large amount of a metal compound, is low in tiny contaminants, high in softening point, low in coloration, and excellent in static adhesion at the time of melt film formation.

Other and further objects, features, and advantages of the invention will appear more fully from the following description.

DETAILED DESCRIPTION OF THE INVENTION

The above object has been attained by the method described below. That is, the present invention provides (1) a method for producing PEN from major components that comprise a naphthalenedicarboxylic acid comprising a naphthalenedicarboxylic acid represented by the following formula (I) (e.g., 2,6-naphthalenedicarboxylic acid) as a main component; and a glycol comprising ethylene glycol as a main component; in the presence of one or more compounds selected from the group consisting of glycol-soluble magnesium compounds, glycol-soluble manganese compounds, and glycol-soluble zinc compounds; a nitrogen-containing basic compound; and a phosphorous compound; which method comprises adding a glycol-soluble germanium compound, as a polymerization catalyst, in the form of a solution in a glycol; the said metal compound; the said nitrogen-containing basic compound; and the said phosphorous compound; such that a relationship expressed by the following expressions is satisfied:

formula (I)

expressions $$0.005 < M < 1.0 \quad (1)$$

$$0.00015 < M/P < 0.024 \quad (2)$$

$$0.01 < A/(M+G) < 0.70 \quad (3)$$

$$0.21 < G < 2.18 \quad (4)$$

wherein
- M: the amount of the magnesium, and/or manganese, and/or zinc atoms to be added on the basis of the polymer (g atom/ton),
- P: the amount of the phosphorus atoms to be added on the basis of the polymer (ppm),
- A: the number of mol of the nitrogen-containing basic compound to be added on the basis of the polymer (mol/ton), and
- G: the amount of the germanium atoms to be added on the basis of the polymer (g atom/ton).

The present invention also provides (2) a method for producing PEN stated under (1) above, wherein the germanium compound used is dissolved in ethylene glycol at a temperature of 165° C. or higher but 195° C. or below within 8 hours in an amount of 0.2 wt % or more but 0.7 wt % or below in terms of germanium atoms based on the ethylene glycol.

The present invention also provides (3) a method for producing PEN stated under (1) above, wherein the solution of the germanium compound in ethylene glycol is added to the reaction system substantially before the esterification reaction between the naphthalenedicarboxylic acid, mainly comprising 2,6-naphthalenedicarboxylic acid, and the glycol, mainly comprising ethylene glycol, is started.

The present invention will now be described below in more detail.

The present invention is preferably applied to PEN mainly made up of 2,6-naphthalenedicarboxylic acid, and it also can be applied to polyesters made up of PEN and 20% or less of copolymer components, which components include 1,6-naphthalenedicarboxylic acid, 1,5-naphthalenedicarboxylic acid, 2,5-naphthalenedicarboxylic acid, and 2,7-naphthalenedicarboxylic acid as naphthalenedicarboxylic acids. As glycol components that can be copolymerizable components, for example, diethylene glycol, triethylene glycol, butanediol, cyclohexamethanediol, neopentyl glycol, and xylylenediol can be mentioned.

The glycol comprising ethylene glycol as a main component used for dissolving and diluting the germanium catalyst by heating may contain the above glycol components, and the glycol used for dissolving the germanium catalyst and the glycol used for diluting the germanium catalyst may not be the same.

If the amount of the glycol-soluble metal atoms to be added and the amount of the phosphorus compound to be added fall outside the above expressions (1) and (2), the static-electricity-applying property at the time of film formation cannot be retained, leading to the formation of a base poor in evenness or a polyester that is colored, which base is therefore not preferable as a raw material for a photograph support.

If the amount of the nitrogen-containing basic compound to be added is small for the total amount of the glycol-soluble metal atoms and the germanium atoms, diethylene glycol, which lowers the softening point of the polymer, is produced concomitantly. Further, if the nitrogen-containing basic compound is excessive, the polymer will be colored. The polymers of both of the cases are not preferable as raw materials for photograph supports.

If the amount of the germanium atoms to be added is smaller than 0.21 atom/ton (per ton of the polymer), the polymerization proceeds slowly, so that not only the productivity of the polymer is lowered but also the polymer is exposed to high temperature for a longer period of time, which causes unpreferable decomposition reactions to take place, thereby lowering the quality of the polymer. If the amount of the germanium atoms exceeds 2.18 g atom/ton, the effect of the polymerization in proportion to the amount is not secured and only the cost is increased, which is not preferable.

The addition of the solution of a germanium compound in ethylene glycol to the reaction system before the start of the esterification reaction enhances the effect of dispersing the germanium compound, so that the occurrence of contaminants in the polyester can be suppressed further effectively.

Further, if too much time is taken to dissolve the germanium compound in the glycol, not only the productivity is lowered but also the amount of diethylene glycol in the ethylene glycol is increased, which lowers the quality of the polymer. If the dissolution is stopped halfway and the undissolved germanium compound is added to the reaction system, contaminants in the polymer increase, which means that the obtainable polymer lacks suitability as a raw material for photograph supports as intended by the present invention.

As the glycol-soluble germanium compound, germanium dioxide and germanium tetrachloride can be mentioned, with preference given to germanium dioxide, and a particularly preferable one is hexahedral or amorphous germanium dioxide or a mixture thereof, which will be dissolved at a temperature of 165° C. or higher but 195° C. or below within 8 hours in an amount of 0.2 wt % or more but 0.7 wt % or less in terms of germanium atoms based on the ethylene glycol.

Although PEN of the present invention can be produced batchwise or semi-continuously or continuously, a batchwise process will be described below.

The 2,6-naphthalenedicarboxylic acid and the ethylene glycol are made into a slurry in an esterification reaction reactor, or they are made into a slurry after they are charged into the esterification reaction reactor.

Preferably the molar ratio of the 2,6-naphthalenedicarboxylic acid to the ethylene glycol to be charged is from 1:1.05 to 1:2.5.

The temperature in the reactor is successively elevated, to heat the slurry to start the esterification reaction between 2,6-naphthalenedicarboxylic acid and ethylene glycol. The reaction is carried out with stirring, and the temperature is preferably 240° to 330° C. The reaction is carried out with the reaction system being under normal pressure or under pressure, with preference given to a pressure of 5 kg/cm$^2$ G or below. The esterification reaction proceeds without using any catalyst. The reaction is carried out with the water that is a by-product of the esterification, which water is removed from the distillation column attached to the reactor. When the esterification reaction is completed, the distillation of water stops.

Next, a polycondensation reaction step will be carried out, but before it is carried out contaminants in the reaction liquid may be removed through a filter. The polycondensation reaction is carried out under reduced pressure at 270° to 330° C., with ethylene glycol that is a by-product of the condensation reaction, which ethylene glycol is removed outside the reaction system. In order to evade bumping of the reaction liquid, preferably the initial reduction of the pressure is carried out gradually. The final degree of vacuum generally used is 1 to 0.01 mmHg. Preferably, the polycondensation reaction catalyst is added before the start of the polycondensation reaction step.

As the glycol-soluble magnesium compound, the glycol-soluble manganese compound, and the glycol-soluble zinc compound that are used in the present invention, organic carboxylic acid salts, such as acetates, oxalates, and benzoates, halides, and hydroxides can be mentioned.

Specific examples are magnesium acetate, manganese acetate, zinc acetate, magnesium oxalate, manganese oxalate, zinc oxalate, magnesium benzoate, manganese benzoate, zinc benzoate, magnesium chloride, manganese chloride, zinc chloride, magnesium bromide, manganese bromide, zinc bromide, and magnesium hydroxide.

As the phosphorus compound, phosphorous acid, phosphoric acid and/or their esters can be used.

Specific examples of the phosphorus compound are phosphorous acid, phosphoric acid, trimethyl phosphate, triethyl phosphate, triphenyl phosphate, and mono- or di-esters of phosphoric acid or phosphorous acid.

As the nitrogen-containing basic compound can be mentioned a tertiary amine and a quaternary ammonium hydroxide compound, specifically, for example, triethylamine, tributylamine, dimethylaniline, pyridine, quinoline, tetraethylammonium hydroxide, tetrabutylammonium hydroxide, triethylbenzylammonium hydroxide, 1,8-diazabicyclo(5,4,0)undecene, imidazole and its derivatives, and 1,4-biazacyclo(2,2,2)octane.

According to the present method, PEN can be produced that is excellent in static-electricity-applying property at the time of film formation, low in contaminants, good in transparency, and suitable as a raw material for producing supports of photographic films.

The present invention will now be described with reference to Examples below, but the present invention is not limited to them.

I. Procedure in total in Examples and Comparative Examples

Germanium dioxide serving as a catalyst was charged together with ethylene glycol into a stirring tank equipped with a heating jacket and was dissolved by heating with nitrogen being passed through the tank.

126 Parts by weight of 2,6-naphthalenedicarboxylic acid, ethylene glycol, the above solution of germanium dioxide in ethylene glycol, and a solution of a glycol-soluble metal compound in ethylene glycol were charged into an esterification reaction reactor, with the total amount of the ethylene glycol being 59.8 parts by weight; the contents were stirred well, to be made into a slurry while they were heated. The reaction temperature was allowed to reach 255° C., while water that was produced concomitantly was removed from the distillation column.

The reaction was allowed to proceed for 4 hours, and after confirmation that the incidental production of water had stopped, the polyester, that is, the oligomer that was a reaction product, was taken out to a polycondensation reactor, and a nitrogen-containing basic compound and a phosphorus compound were added.

After they were allowed to stand for about 10 min with stirring, the pressure of the system was decreased gradually; the polycondensation reaction was carried out at 275° to 310° C.; and by judging the point at which the stirring machine showed a prescribed torque value to be the point where the reaction reached the end point, the polyester was removed.

II. Measurement of the properties of the polyesters obtained in Examples and Comparative Examples (1) Intrinsic Viscosity (I. V.)

The polyester was dissolved in a phenol/tetrachloroethane (3:2 by weight) mixed solvent and the measurement was effected with an Ubbellohde viscometer at 25° C. In the present invention, the intrinsic viscosity is preferably in the range from 0.55 to 0.70.

(2) Hue (b value)

The hue of the polyester in the shape of chips was measured with a color-measuring color-difference meter (ND-101 model, manufactured by Nihondenshoku-kogyo). The greater the b value is, the more intense the yellow is.

(3) DEG content

After PEN was decomposed with a solution of sodium hydroxide in methanol, each content of all glycol components including DEG (diethylene glycol) was measured by gas chromatography, and the amount of DEG was shown in mol % based on the total glycol component of PEN. In the present invention, the amount of DEG is preferably 3 mol % or below, more preferably 2 mol % or below. The smaller the amount the better it is. When the amount is too much, the glass transition temperature of PEN obtained becomes lowered, resulting in deterioration of heat resistance and in lowering the strength of film formed.

(4) Property at applying static electricity

A thin wire electrode was positioned between the mouthpiece of the extruder and the cooling drum, and it was judged whether film formation could be carried out favorably (◯) at a film formation speed of 50 m/min with a DC voltage of 5 kV being applied between the thin wire and the cooling drum or not (X).

(5) Number of Contaminants

After the polyester was melt-extruded, the obtained sheet was stretched 3.3 times longitudinally and laterally, to form a film having a thickness of 100 μm, 50 cm² of which was observed with a polarization microscope, and judgment was effected as follows based on the number of contaminants having a size of 10 μm or over:

○: the number of contaminants was 0 to 2.
Δ: the number of contaminants was 3 to 10.
X: the number of contaminants was 11 or more.

With respect to Examples, the conditions under which the germanium compound was dissolved in ethylene glycol in the batch-wise PEN production process of the present invention, and the conditions under which the prepared solution and other additives, including glycolsoluble metal compounds, were added, are described below in comparison with those of Comparative Examples, and they are summarized in Tables 1 to 4. Esterification conditions and polycondensation conditions used in producing polyesters described in Examples and Comparative Examples were the same as those described above for the production conditions.

The results of the evaluation of the quality characteristics of the produced PENs are shown in Table 5.

TABLE 1

| | Conditions for dissolving and adding germanium compound | | | |
|---|---|---|---|---|
| | Dissolving Condition | | | |
| | Concentration (wt %) | Temperature (°C.) | Time (Hr.) | Adding Condition (Parts by weight) |
| Example 1 | 0.6 | 175 | 6.5 | 0.96 |
| Example 2 | 0.6 | 185 | 5.0 | 0.96 |
| Example 3 | 0.3 | 175 | 4.5 | 0.96 |
| Example 4 | 0.3 | 190 | 3.5 | 3.84 |

TABLE 1-continued

| | Conditions for dissolving and adding germanium compound | | | |
|---|---|---|---|---|
| | Dissolving Condition | | | |
| | Concentration (wt %) | Temperature (°C.) | Time (Hr.) | Adding Condition (Parts by weight) |
| Comparative Example 1 | 1.0 | 160 | 8.0 | 0.57 |
| Comparative Example 2 | 0.6 | 175 | 6.5 | 0.96 |
| Comparative Example 3 | 0.6 | 175 | 10.0 | 0.96 |
| Comparative Example 4 | 0.6 | 195 | 4.0 | 2.79 |
| Comparative Example 5 | 0.6 | 175 | 6.5 | 0.96 |
| Comparative Example 6 | 0.6 | 175 | 6.5 | 0.20 |

TABLE 2

| | Conditions for adding additves | | | |
|---|---|---|---|---|
| | Glycol-soluble metal Compound | | Phosphorous Compound | |
| | Speciess | Added Amount (Parts by weight) | Speciess | Added Amount (Parts by weight) |
| Example 1 | Magnesium acetate | 0.009 | Phosphoric acid | 0.016 |
| Example 2 | Magnesium acetate | 0.011 | Trimethyl phosphate | 0.027 |
| Example 3 | Manganese acetate | 0.010 | Phosphoric acid | 0.010 |
| Example 4 | Zinc acetate | 0.003 | Triphenyl phosphate | 0.017 |
| Comparative Example 1 | Magnesium acetate | 0.009 | Phosphoric acid | 0.016 |
| Comparative Example 2 | Manganese acetate | 0.010 | Phosphoric acid | 0.016 |
| Comparative Example 3 | Magnesium acetate | 0.026 | Trimethyl phosphate | 0.067 |
| Comparative Example 4 | Manganese acetate | 0.002 | Trimethyl phosphate | 0.015 |
| Comparative Example 5 | Magnesium acetate | 0.009 | Phosphoric acid | 0.016 |
| Comparative Example 6 | Magnesium acetate | 0.006 | Phosphoric acid | 0.016 |

TABLE 3

(Continuation of Table 2)
Conditions for adding additves

| | Nitrogen-containing Basic Compound | |
|---|---|---|
| | Species | Added Amount (Parts by weight) |
| Example 1 | 1,8-Diazabicyclo(5,4,0)undecene | 0.0028 |
| Example 2 | 2-Ethyl-4-methylimidazole | 0.0016 |
| Example 3 | 2-Ethyl-4-methylimidazole | 0.0050 |
| Example 4 | 1,8-Diazabicyclo(5,4,0)undecene | 0.0095 |
| Comparative Example 1 | 2-Ethyl-4-methylimidazole | 0.0028 |
| Comparative Example 2 | 2-Ethyl-4-methylimidazole | 0.0028 |
| Comparative Example 3 | 1,8-Diazabicyclo(5,4,0)undecene | 0.0022 |
| Comparative Example 4 | 1,8-Diazabicyclo(5,4,0)undecene | 0.0278 |
| Comparative Example 5 | 1,8-Diazabicyclo(5,4,0)undecene | 0.0001 |
| Comparative Example 6 | 1,8-Diazabicyclo(5,4,0)undecene | 0.0028 |

TABLE 4

(Continuation of Table 2)
Conditions for adding additves

| | G (g atom/ton) | M (g atom/ton) | P (ppm) | A (mol/ton) | M/P | A/(M + G) |
|---|---|---|---|---|---|---|
| Example 1 | 0.86 | 0.44 | 54.7 | 0.20 | 0.0080 | 0.154 |
| Example 2 | 0.86 | 0.58 | 65.0 | 0.16 | 0.0089 | 0.111 |
| Example 3 | 0.43 | 0.42 | 35.5 | 0.50 | 0.0118 | 0.588 |
| Example 4 | 1.73 | 0.15 | 18.1 | 0.68 | 0.0083 | 0.368 |
| Comparative Example 1 | 0.86 | 0.44 | 54.7 | 0.20 | 0.0080 | 0.154 |
| Comparative Example 2 | 0.86 | 0.44 | 54.7 | 0.20 | 0.0080 | 0.154 |
| Comparative Example 3 | 0.86 | 1.33 | 162.6 | 0.16 | 0.0082 | 0.073 |
| Comparative Example 4 | 2.51 | 0.10 | 36.1 | 2.00 | 0.0028 | 0.766 |
| Comparative Example 5 | 0.86 | 0.44 | 54.7 | 0.01 | 0.0080 | 0.008 |
| Comparative Example 6 | 0.18 | 0.30 | 54.7 | 0.20 | 0.0055 | 0.417 |

TABLE 5

| | Characteristic Property of PEN | | | | | |
|---|---|---|---|---|---|---|
| | Polymerization time (hr.) | I.V. | b Value | Contaminants | DEG Content (mol %) | Property at applying static-electricity |
| Example 1 | 2.5 | 0.666 | 1.3 | ○ | 1.1 | ○ |
| Example 2 | 2.5 | 0.661 | 1.7 | ○ | 1.5 | ○ |
| Example 3 | 4.0 | 0.662 | 1.6 | ○ | 1.4 | ○ |
| Example 4 | 1.8 | 0.666 | 1.1 | ○ | 1.1 | ○ |
| Comparative Example 1 | 2.5 | 0.669 | 1.2 | X | 1.3 | ○ |
| Comparative Example 2 | 2.4 | 0.663 | 1.2 | X | 1.2 | ○ |
| Comparative Example 3 | 2.6 | 0.665 | 3.6 | ○ | 3.7 | ○ |
| Comparative Example 4 | 1.5 | 0.661 | 1.3 | ○ | 1.3 | X |
| Comparative Example 5 | 2.5 | 0.665 | 3.3 | ○ | 3.4 | ○ |
| Comparative Example 6 | 5.0 | 0.501 | 3.2 | ○ | 3.4 | ○ |

Remarks;
  Comparative Example 1: many contaminants
  Comparative Example 2: many contaminants
  Comparative Example 3: much DEG content and high b value
  Comparative Example 4: bad property at applying static electricity because high electric resistance of molten polymer
  Comparative Example 5: much DEG content and high b value
  Comparative Example 6: not reached at aimed viscosity (I.V.: 0.55 to 0.70)

Example 1

A mixture of hexagonal germanium dioxide and amorphous germanium dioxide was dispersed in ethylene glycol, so that the concentration of the germanium dioxide might be brought to 0.6 wt % in terms of germanium atoms, and the dispersion was heated and stirred at 175° C. After 6.5 hours, sampling was effected, and it was found that the liquid had became transparent.

0.96 Parts by weight of the germanium solution was used as a catalyst solution. Then 0.009 parts by weight of magnesium acetate tetrahydrate, as a glycol-soluble metal compound, 0.016 parts by weight of phosphoric acid, as a phosphorus compound, and 0.0028 parts by weight of 1,8-diazabicyclo(5,4,0)undecene, as a nitrogen-containing basic compound, were added in the manner described above.

Example 2

Germanium dioxide identical to that used in Example 1 was heated and stirred at 185° C., and after 5 hours it had been completely dissolved. 0.96 Parts by weight of this liquid was used as a catalyst solution.

Then, 0.011 parts by weight of magnesium acetate tetrahydrate, as a glycol-soluble metal compound, 0.027 parts by weight of trimethyl phosphate, as a phosphorus compound, and 0.0016 parts by weight of 2-ethyl-4-methylimidazole, as a nitrogen-containing basic compound, were added.

Example 3

Germanium dioxide identical to that used in Example 1 was dispersed in ethylene glycol, so that the concentration of the germanium dioxide might be brought to 0.3 wt % in terms of germanium atoms, and the dispersion was heated and stirred at 175° C. After 4.5 hours, sampling was effected, and it was found that the germanium dioxide had been completely dissolved. 0.96 Parts by weight of this liquid was used as a catalyst solution.

0.010 Parts by weight of magnesium acetate tetrahydrate, as a glycol-soluble metal compound, 0.010 parts by weight of phosphoric acid, as a phosphorus compound, and 0.0050 parts by weight of 2-ethyl-4-methylimidazole, as a nitrogen-containing basic compound, were added.

Example 4

Germanium dioxide identical to that used in Example 1 was dispersed in ethylene glycol, so that the concentration of the germanium dioxide might be brought to 0.3 wt % in terms of germanium atoms, and the dispersion was heated and stirred at 190° C. After 3.5 hours, sampling was effected, and it was found that the germanium had been completely dissolved. 3.84 Parts by weight of this liquid was used as a catalyst solution.

0.003 Parts by weight of zinc acetate dihydrate, as a glycol-soluble metal compound, 0.017 parts by weight of triphenyl phosphate, as a phosphorus compound, and 0.0095 parts by weight of 1,8-diazabicyclo(5,4,0)undecene, as a nitrogen-containing basic compound, were added.

Comparative Example 1

Germanium dioxide identical to that used in Example 1 was dispersed in ethylene glycol, so that the concentration of the germanium dioxide might be brought to 1.0 wt % in terms of germanium atoms, and the dispersion was heated and stirred at 160° C. After 6 hours, the germanium dioxide had not been dissolved completely, and, although it was found that the dispersion remained turbid white, 0.57 parts by weight of this liquid was used as a catalyst solution.

0.009 Parts by weight of magnesium acetate tetrahydrate, as a glycol-soluble metal compound, 0.016 parts by weight of phosphoric acid, as a phosphorus compound, and 0.0028 parts by weight of 2-ethyl-4-methylimidazole, as a nitrogen-containing basic compound, were added.

Comparative Example 2

Germanium dioxide that mainly consisted of a tetragonal system was dispersed in ethylene glycol, so that the concentration of the germanium dioxide might be brought to 0.6 wt % in terms of germanlure atoms, and the dispersion was heated and stirred at 175° C. After 6.5 hours, sampling was effected, and, although it was found that the dispersion remained turbid white, 0.96 parts by weight of this liquid was used as a catalyst solution.

0.010 parts by weight of manganese acetate tetrahydrate, as a glycol-soluble metal compound, 0.016 parts by weight of phosphoric acid, as a phosphorus compound, and 0.0028 parts by weight of 2-ethyl-4-methylimidazole, as a nitrogen-containing basic compound, were added.

Comparative Example 3

Germanium dioxide identical to that used in Example 1 was dispersed in ethylene glycol, so that the concentration of the germanium dioxide might be brought to 0.6 wt % in terms of germanium atoms, and the dispersion was heated and stirred at 175° C. After 6.5 hours, sampling was effected, and, although it was found that the germanium had been completely dissolved, the heating was continued for a further 10 hours. 0.96 Parts by weight of this liquid was used as a catalyst solution.

0.026 Parts by weight of magnesium acetate tetrahydrates as a glycol-soluble metal compound, 0.067 parts by weight of trimethyl phosphate, as a phosphorus compound, and 0.0022 parts by weight of 1,8-diazabicyclo(5,4,0)undecene, as a nitrogen-containing basic compound, were added.

Comparative Example 4

Germanium dioxide identical to that used in Example 1 was dispersed in ethylene glycol, so that the concentration of the germanium dioxide might be brought to 0.6 wt % in terms of germanium atoms, and the dispersion was heated and stirred at 195° C. After 4.0 hours, sampling was effected, and it was found that the germanium had been completely dissolved. 2.79 Parts by weight of this liquid was used as a catalyst solution.

0.023 Parts by weight of manganese acetate tetrahydrate, as a glycol-soluble metal compound, 0.015 parts by weight of methyl phosphate, as a phosphorus compound, and 0.0278 parts by weight of 1,8-diazabicyclo(5,4,0)undecene, as a nitrogen-containing basic compound, were added.

Comparative Example 5

Example 1 was repeated, except that the amount of 1,8-diazabicyclo(5,4,0)undecene was changed to 0.00014 parts by weight (that is, it was decreased to 1/20).

Comparative Example 6

Example 1 was repeated, except that the amount of the catalyst solution to be added was changed to 0.20 parts by weight. After 5 hours of polymerization, the increase in the torque of the stirring machine of the polymerization reactor stopped and the intended degree of polymerization could not be attained.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method for producing a polyethylene naphthalate, which comprises reacting
   (A) a naphthalenedicarboxylic acid comprising a naphthalenedicarboxylic acid represented by the following formula (I) as its main component; with
   (B) a glycol comprising ethylene glycol as its main component;
   in the presence of (a) at least one metal compound selected from the group consisting of glycol-soluble magnesium compounds, glycol-soluble manganese compounds, and glycol-soluble zinc compounds; (b) a nitrogen-containing basic compound; and (c) a phosphorous compound selected from the group consisting of triethylamine, tributylamine, dimethylaniline, pyridine, quinoline, tetraethylammonium hydroxide, tetrabutylammonium hydroxide, triethylbenzylammonium hydroxide, 1,8-diazabicyclo(5;4,0)undecene; imidazole and its derivatives, and 1,4-biazacyclo(2,2,2)octane; and further in the presence of (d) a glycol-soluble germanium compound in the form of a solution in a glycol;

the amount of the metal compound, the nitrogen-containing basic compound, the phosphorous compound, and the germanium compound being such that a relationship expressed by the following expressions is satisfied: formula (I)

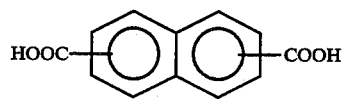

expressions $$0.005 < M < 1.0 \quad (1)$$

$$0.00015 < M/P < 0.024 \quad (2)$$

$$0.01 < A/(M+G) < 0.70 \quad (3)$$

$$0.21 < G < 2.18 \quad (4)$$

wherein
   M: the amount of the magnesium, manganese, and zinc atoms to be added on the basis of the polymer (g atom/ton),
   P: the amount of the phosphorous atoms to be added on the basis of the polymer (ppm),
   A: the number of mols of the nitrogen-containing basic compound to be added on the basis of the polymer (mol/ton), and
   G: the amount of the germanium atoms to be added on the basis of the polymer (g atom/ton).

2. The method for producing a polyethylene naphthalate as claimed in claim 1, wherein the naphthalenedicarboxylic acid is 2,6-naphthalenedicarboxylic acid.

3. The method for producing a polyethylene naphthalate as claimed in claim 1, wherein the germanium compound dissolved in ethylene glycol at a temperature of 165° to 195° C. within 8 hours in an amount of 0.2 to 0.7 wt % in terms of germanium atoms based on the ethylene glycol is used.

4. The method for producing a polyethylene naphthalate as claimed in claim 1, wherein the solution of the germanium compound in ethylene glycol is added to the reaction system substantially before the esterification reaction between the naphthalenedicarboxylic acid and the glycol is started.

5. The method for producing a polyethylene naphthalate as claimed in claim 1, wherein the polyethylene naphthalate comprises 20% or less copolymer components made up of a naphthalenedicarboxylic acid and a glycol.

6. The method for producing a polyethylene naphthalate as claimed in claim 1, wherein the glycol-soluble germanium compound is germanium dioxide or germanium tetrachloride.

7. The method for producing a polyethylene naphthalate as claimed in claim 6, wherein the glycolsoluble germanium compound is a hexahedral or amorphous germanium dioxide or a mixture thereof.

8. The method for producing a polyethylene naphthalate as claimed in claim 1, wherein the molar ratio of the naphthalenedicarboxylic acid to the glycol to be charged is from 1:1.05 to 1:2.5.

9. The method for producing a polyethylene naphthalate as claimed in claim 1, wherein an esterification reaction between the naphthalenedicarboxylic acid and the glycol is carried out at 240° to 330° C. under a pressure of 5 kg/cm$^2$ G or below, and then a polycondensation reaction is carried out at 270° to 330° C. under reduced pressure.

10. The method for producing a polyethylene naphthalate as claimed in claim 1, wherein the glycol-soluble magnesium compound is selected from the group consisting of magnesium acetate, magnesium oxalate, magnesium benzoate, magnesium chloride, magnesium bromide, and magnesium hydroxide.

11. The method for producing a polyethylene naphthalate as claimed in claim 1, wherein the glycol-soluble manganese compound is selected from the group consisting of manganese acetate, manganese oxalate, manganese benzoate, manganese chloride, and manganese bromide.

12. The method for producing a polyethylene naphthalate as claimed in claim 1, wherein the glycol-soluble zinc compound is selected from the group consisting of zinc acetate, zinc oxalate, zinc benzoate, zinc chloride, and zinc bromide.

13. The method for producing a polyethylene naphthalate as claimed in claim 1, wherein the phosphorous compound is selected from the group consisting of phosphorous acid, phosphoric acid, trimethyl phosphate, triethyl phosphate, triphenyl phosphate, and mono- or di-esters of phosphoric acid or phosphorous acid.

* * * * *